M. M. O'DONNELL.
COOKING UTENSIL.
APPLICATION FILED FEB. 23, 1917.
1,310,208.
Patented July 15, 1919.
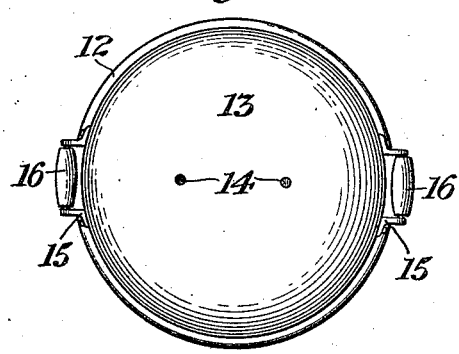
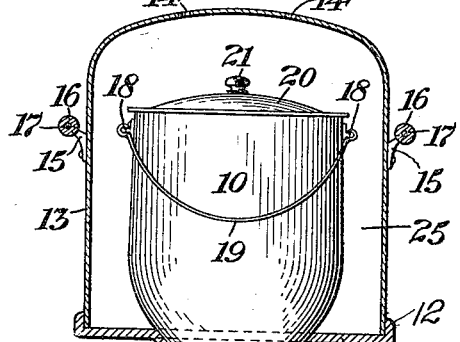
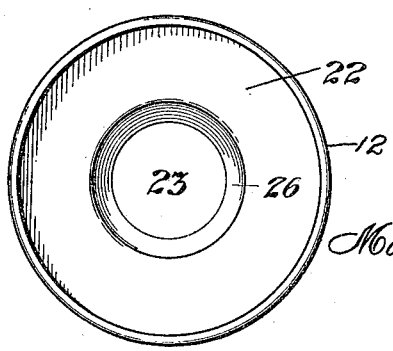
WITNESS:
Chas. J. Clagett
INVENTOR
Mary M. O'Donnell
BY Serrell Son
HER ATTORNEYS.

UNITED STATES PATENT OFFICE.

MARY M. O'DONNELL, OF NEW YORK, N. Y.

COOKING UTENSIL.

1,310,208.  Specification of Letters Patent.  Patented July 15, 1919.

Application filed February 23, 1917. Serial No. 150,333.

*To all whom it may concern:*

Be it known that I, MARY M. O'DONNELL, a citizen of the United States, residing at the borough of Manhattan, in the city, county, and State of New York, have invented an Improvement in Cooking Utensils, of which the following is a specification.

My invention relates to a device for cooking soups, vegetables and meats, such as are usually boiled in a pot or vessel placed upon the top of a cooking stove or gas range, and its object is to economize in the fuel supply and lessen the care and attention of the cook. The details of the invention are hereinafter particularly described.

In the accompanying drawing:

Figure 1 is an elevation of my invention partly in section.

Fig. 2 is a plan view of the same.

Fig. 3 is a plan view of the base.

Similar reference characters denote like parts throughout the several views.

10, indicates the vessel for holding liquid and the material to be cooked.

13, designates a jacket of greater diameter than the vessel 10, open at its bottom and adapted to be seated upon the disk-like base 22, and fit within and against the annular upturned flange 12 at the outer edge thereof.

In the top of the jacket 13 adjacent its center, there are one or more apertures 14 forming steam vents.

The jacket may be provided with any suitable handle or handles, I prefer and have shown spaced lugs 15 attached to or cast integral with the jacket upon two opposite sides thereof, with wooden handle bars 16 through which pass rods 17 connected at their ends to said lugs.

I also prefer to provide ears 18 upon two opposite sides of the inner vessel 10 to which is pivotally connected the ends of a bail 19 by which the vessel 10 may be lifted or carried.

It is also preferable to provide a cover 20 for the vessel 10 having a wooden knob 21 to be grasped by the fingers in placing the cover upon the vessel or removing it therefrom.

The disk-like base 22 is made separate from the pot or vessel 10, and jacket 13, and is provided with a central circular opening 23, formed by depressing the metal at this point and cutting off the bottom, which leaves an inwardly inclined annular flange 26 around the opening below the horizontal portion of the disk. This inclined annular flange forms a seat for the inner vessel 10 and permits the bottom of the vessel to come directly upon the top of a stove.

The space 25, between the inner vessel 10 and jacket or outer covering member 13 forms a hot-air chamber which will retain the heat for a long time after the contents of the inner vessel 10 have been heated to the desired degree, and the housemaid may safely leave the kitchen to attend to other household duties having first turned the gas supply very low, assured that the cooking will proceed properly during her absence, thus greatly economizing in the amount of gas or fuel consumed, and relieving her from constant attention to the cooking operation.

I claim as my invention:

1. In a cooking utensil, the combination of a disk having an upturned annular flange at its outer edge and a central circular opening surrounded below the horizontal portion by an inwardly inclined annular flange, a vessel seated within said opening and against said inclined flange, and a jacket seated upon said disk within said upturned flange at the outer edge.

2. In a cooking utensil, the combination of a disk having an upturned annular flange at its outer edge and a central circular opening surrounded below the horizontal portion by an inwardly inclined annular flange, a vessel seated within said opening and against said inclined flange, and a jacket seated upon said disk within said upturned flange at the outer edge and provided with vents in its top and handles upon its opposite sides.

Signed by me this 7th day of February, 1917.

MARY M. O'DONNELL.

Copies of this patent may be obtained for five cents each, by addressing the "Commissioner of Patents, Washington, D. C."